United States Patent
Zhou (10) Patent No.: US 9,959,841 B2
(45) Date of Patent: May 1, 2018

(54) IMAGE PRESENTATION CONTROL METHODS AND IMAGE PRESENTATION CONTROL APPARATUSES

(71) Applicant: Beijing Zhigu Rui Tuo Tech Co., Ltd, Beijing (CN)

(72) Inventor: Liang Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days. days.

(21) Appl. No.: 15/121,766

(22) PCT Filed: Mar. 12, 2015

(86) PCT No.: PCT/CN2015/074063
§ 371 (c)(1),
(2) Date: Aug. 25, 2016

(87) PCT Pub. No.: WO2015/149611
PCT Pub. Date: Oct. 8, 2015

(65) Prior Publication Data
US 2017/0076697 A1    Mar. 16, 2017

(30) Foreign Application Priority Data

Apr. 1, 2014    (CN) .......................... 2014 1 0128145

(51) Int. Cl.
*G09G 5/36*    (2006.01)
*G02B 27/01*    (2006.01)
(Continued)

(52) U.S. Cl.
CPC ............. *G09G 5/363* (2013.01); *G02B 27/01* (2013.01); *G02B 27/017* (2013.01); *G06F 3/013* (2013.01);
(Continued)

(58) Field of Classification Search
CPC ...... G09G 5/377; H04N 5/272; H04N 9/3182; H04N 9/3194; G02B 27/01; G02B 27/017
See application file for complete search history.

(56) References Cited

U.S. PATENT DOCUMENTS 8,752,963 B2 * 6/2014 McCulloch .......... H04N 13/044
351/158
2003/0085867 A1    5/2003 Grabert
(Continued)

FOREIGN PATENT DOCUMENTS

CN        1608222 A    4/2005
CN        1988628 A    6/2007
(Continued)

OTHER PUBLICATIONS

International Search Report for PCT Application No. PCT/CN2015/074063, dated Jun. 2, 2015, 4 pages.

*Primary Examiner* — Antonio A Caschera
(74) *Attorney, Agent, or Firm* — Amin, Turocy & Watson, LLP (57) ABSTRACT

The disclosed subject matter generally relates to image presentation control methods and image presentation control apparatuses. The disclosed subject matter can comprise acquiring at least one piece of background information corresponding to the field of view of at least one eye of a user; adjusting, according to the at least one piece of background information, at least one presentation parameter corresponding to at least one image; and presenting, by means of near-to-eye presentation, the at least one image to the at least one eye according to the at least one presentation parameter that adjusted. In an embodiment of the disclosed subject matter, a presentation parameter corresponding to a to-be-presented image can be adjusted with reference to a
(Continued)

content attribute of the image by analyzing a background environment feature of near-to-eye presentation.

35 Claims, 6 Drawing Sheets

(51) Int. Cl.
    *H04N 9/31*     (2006.01)
    *H04N 5/272*     (2006.01)
    *G06F 3/14*     (2006.01)
    *G06F 3/01*     (2006.01)
    *G09G 5/377*     (2006.01)

(52) U.S. Cl.
    CPC ............... *G06F 3/14* (2013.01); *G09G 5/377* (2013.01); *H04N 5/272* (2013.01); *H04N 9/3182* (2013.01); *H04N 9/3194* (2013.01); *G09G 2354/00* (2013.01)

(56) References Cited

U.S. PATENT DOCUMENTS

| | | |
|---|---|---|
| 2010/0079468 A1 | 4/2010 | Pance et al. |
| 2011/0316896 A1 | 12/2011 | Okamoto et al. |
| 2012/0249501 A1 | 10/2012 | Yonishi |
| 2012/0306940 A1 | 12/2012 | Machida et al. |
| 2013/0050833 A1 | 2/2013 | Lewis et al. |
| 2013/0106815 A1 | 5/2013 | Virolainen et al. |
| 2013/0114043 A1 | 5/2013 | Balan et al. |
| 2014/0063473 A1 | 3/2014 | Pasolini |
| 2017/0076461 A1* | 3/2017 | Zhou .................... G06T 7/0081 |

FOREIGN PATENT DOCUMENTS

| | | |
|---|---|---|
| CN | 102809821 A | 12/2012 |
| CN | 102928979 A | 2/2013 |
| CN | 103020954 A | 4/2013 |
| CN | 103595912 A | 2/2014 |
| CN | 103929605 A | 7/2014 |
| CN | 103929606 A | 7/2014 |
| EP | 2663080 A1 | 11/2013 |
| WO | 2013140594 A1 | 9/2013 |
| WO | 2015043275 A1 | 2/2015 |
| WO | 2015149611 A1 | 10/2015 |
| WO | 2015149612 A1 | 10/2015 |

* cited by examiner

IMAGE PRESENTATION CONTROL METHODS AND IMAGE PRESENTATION CONTROL APPARATUSES

RELATED APPLICATION

The present application is a U.S. National Stage filing under 35 U.S.C. § 371 of international patent cooperation treaty (PCT) application No. PCT/CN2015/074063, filed Mar. 12, 2015, and entitled "IMAGE PRESENTATION CONTROL METHODS AND IMAGE PRESENTATION CONTROL APPARATUSES", which claims the benefit of priority to Chinese Patent Application No. 201410128145.X, filed on Apr. 1, 2014, which applications are hereby incorporated into the present application by reference herein in their respective entireties.

TECHNICAL FIELD

This application relates to the field of image processing, and in particular, to image presentation control methods and image presentation control apparatuses.

BACKGROUND

With the improvement of coverage and network speed of a wireless network, a near-to-eye optical wearable device is becoming a new personal data acquiring and sharing channel.

Because the near-to-eye optical wearable device is near to a user eye in terms of use position, compared with other non-near-to-eye mobile display devices, the near-to-eye optical wearable device has many inherent advantages, for example, image information can be directly presented within the sight of a user without assistance of a hand or hands of the user; in addition, a larger visual presentation region is achieved, wherein content can be presented on any plane in the field of view of the user.

SUMMARY

An example, non-limiting objective of one or more embodiments of this application is to provide an image presentation control technology.

According to a first example aspect, this application provides an image presentation control method, comprising:

acquiring at least one piece of background information corresponding to the field of view of at least one eye of a user;

adjusting, according to the at least one piece of background information, at least one presentation parameter corresponding to at least one image; and presenting the at least one image to the at least one eye according to the at least one presentation parameter that adjusted by means of near-to-eye presentation.

According to a second example aspect, this application provides an image presentation control apparatus, comprising:

a background information acquisition module, configured to acquire at least one piece of background information corresponding to the field of view of at least one eye of a user;

a presentation parameter adjustment module, configured to adjust, according to the at least one piece of background information, at least one presentation parameter corresponding to at least one image; and a presentation module, configured to present, by means of near-to-eye presentation, the at least one image to the at least one eye according to the at least one presentation parameter adjusted by the presentation parameter adjustment module.

According to a third example aspect, this application provides a wearable device, comprising the image presentation control apparatus.

In at least one embodiment of this application, before image presentation, a presentation parameter corresponding to a to-be-presented image is adjusted in advance with reference to a content attribute of the image by analyzing a background environment feature of near-to-eye presentation, thereby optimizing the visual presentation effect corresponding to the image and improving the user experience.

DETAILED DESCRIPTION

Various embodiments of this application are further described below in detail with reference to accompanying drawings (a same element is marked by a same number in the accompanying drawings) and embodiments. The following embodiments are intended to describe this application, but not intended to limit the scope of this application.

A person skilled in the art may understand that, the terms such as "first" and "second" in this application are merely used to distinguish different steps, devices, modules, or the like, which do not represent any specific technical meanings, nor indicate a certain logical order between them.

A near-to-eye display technology of a head-mounted wearable device generally is directly projecting an image to a fundus of a user or presenting the image at a near-to-eye position in a see through manner by using a device such as smart glasses. In this case, a background image in a field of view of the user also enters the fundus of the user, and therefore, a final image seen by the user is the overlap of the presented image and the background image; in other words, the quality of the presented image is affected by the background image.

Figure 1:
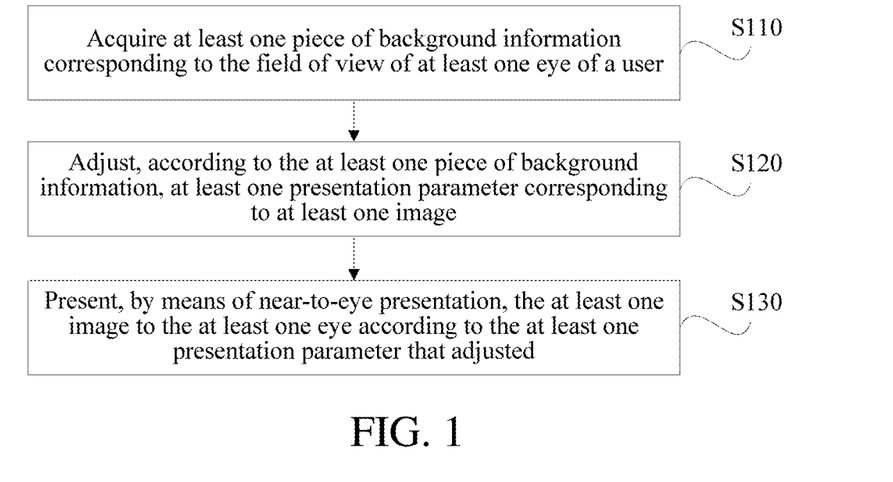
FIG. 1 is an example flowchart of an image presentation control method according to an embodiment of this application.

Therefore, as shown in FIG. 1, an embodiment of this application provides an image presentation control method, comprising:

S110: Acquire at least one piece of background information corresponding to the field of view of at least one eye of a user.

S120: Adjust, according to the at least one piece of background information, at least one presentation parameter corresponding to at least one image.

S130: Present, by means of near-to-eye presentation, the at least one image to the at least one eye according to the at least one presentation parameter that adjusted.

In this embodiment of this application, the presentation is visual presentation.

In this embodiment of this application, the near-to-eye presentation comprises:

see through near-to-eye display presentation or direct-projection-to-fundus presentation.

The see through near-to-eye display presentation is displaying the image at a position near to the eye of the user in a see through manner, wherein while seeing the displayed image, the user can also see a background image in the field of view through the displayed image. Herein, for example, the image may be displayed by a pair of smart glasses on a lens of the glasses in a see through manner, wherein while seeing the displayed image, the user can also see the background image in the field of view as the line of sight passes through the lens.

The direct-projection-to-fundus presentation is directly projecting, at a position near to the eye of the user, an image, to be presented to the user, to a fundus of the user by using a micro projection component and an optical component forming the optical path between the micro projection component and the user eye. Wherein, while seeing the projected image, the user can also see a background image in the field of view through the projected image.

Herein, the image may be a visually presented text, pattern, video, or the like.

In this embodiment of this application, before image presentation, a presentation parameter of an image is adjusted in advance according to background information corresponding to a field of view of a user eye, thereby optimizing the image presentation effect.

The steps in this embodiment of this application are further described by using the following example embodiments.

S110: Acquire at least one piece of background information corresponding to the field of view of at least one eye of a user.

In an example embodiment of this application, the at least one image may be presented to one eye of the user; in this case, the at least one piece of background information corresponds to the field of view of the one eye of the user. In another example embodiment of this application, the at least one image may also be presented to both eyes of the user; in this case, the at least one piece of background information may correspond to the field of view of the both eyes of the user.

Herein, that the at least one piece of background information corresponds to a field of view of an eye of the user refers to that, the at least one piece of background information is at least one piece of background information of a background within a space range within which things are visual to the user eye.

Figure 2A:
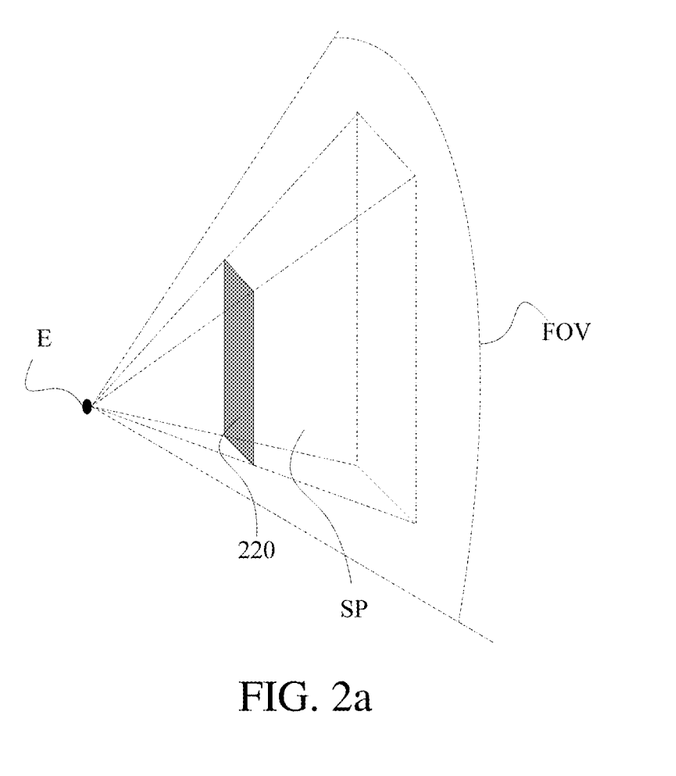
FIG. 2a is an example schematic diagram of a background corresponding to a presentation region of an image in an image presentation control method according to an embodiment of this application.

The background may correspond to the entire field of view, or may correspond to a part of the field of view, for example, the background may be a background of a space range SP corresponding to a presentation region 220 of the at least one image within the field of view FOV of the eye E, as shown in FIG. 2a.

In this embodiment of this application, the background information comprises at least one of the following:

texture information, color information, and luminance information of a background (this application is not limited thereto).

In this embodiment of this application, the texture information of the background comprises: texture distribution information and texture complexity information. The texture complexity information may be measured by using, for example, the number of pixels, the number of colors of pixels and the like in an image region corresponding to a texture. For example, in an example embodiment, the texture distribution information and complexity information may be analyzed by using a discrete cosine transform algorithm.

In this embodiment of this application, the texture of the background may be generated by the texture of the pattern on the surface of an object, the contour of an object, distribution of multiple objects, and the like in the background.

In this embodiment of this application, the method further comprises:

acquiring at least one background image corresponding to the field of view of the at least one eye.

In this embodiment of this application, the background image may be collected, by using an image collection sensor (for example, a camera) on a near-to-eye device, in a direction from the near-to-eye position to the line of sight of the user or a position faced by the user eye.

In an example embodiment of this application, step S110 comprises:

acquiring the at least one piece of background information according to the at least one background image.

In this example embodiment of this application, image processing may be performed on the at least one background image, to obtain texture information, color information, and/or luminance information corresponding to the background.

In another example embodiment of this embodiment of this application, the luminance information of background may also be obtained by collecting the luminance of ambient light, for example, the luminance information may be collected by using a photosensitive component.

For a wearable device, when using the device, the user may move or the user may be on a moving carrier (for example, on a bus), and therefore, the background corresponding to the field of view of the user eye may change; in addition, the presented image may also continuously change, for example, the at least one image may be an image in a video. Therefore, a presentation parameter of the at least one image needs to be dynamically adjusted at a frequency. In this embodiment of this application, step S110 comprises:

acquiring the at least one piece of background information according to a sampling policy.

In this embodiment of this application, the sampling policy comprises a sampling period.

In an example embodiment of this embodiment of this application, the sampling period may be set to a fixed value, for example, a fixed value set by default, a value manually set by the user, or a value corresponding to a presentation frequency of the at least one image.

In another example embodiment of this embodiment of this application, the sampling period is automatically adjusted according to an environment change, a motion state of the user, or the like. In this example embodiment, the method further comprises:

determining the sampling period.

In an example embodiment of this embodiment of this application, the sampling period may be determined according to an image attribute of the at least one image, or the sampling period may be determined according to a background attribute of the background corresponding to the field of view, or the sampling period may be determined according to an external instruction.

In an example embodiment, the image attribute of the at least one image comprises:

an image change frequency of the at least one image.

For example, when the at least one image is a group of photos that are automatically played according to a set time in a slide manner, the sampling period may correspond to the set time, for example, be the same as the set time, and the background information is acquired before each next photo is played (for example, within 0.1 second before the playback).

In an example embodiment, the image attribute of the at least one image comprises:

a dynamic/static attribute of the at least one image.

Herein, the dynamic/static attribute of the image comprises that: the image is a static picture, for example, a photo, or a picture inserted in a webpage; or is an image in a dynamic video, for example, an image of each frame in a movie.

When the image is a static picture, the sampling period may be, for example, set to a long time; when the image is an image in a dynamic video, the sampling period may be, for example, set to a short time.

In this example embodiment, when the at least one image corresponds to a dynamic video, the image attribute could further comprises:

an image scenario attribute of the at least one image.

In this example embodiment, the image scenario attribute of the image comprises:

whether the image is a close-short image or a long-shot image.

Generally, when the image is a long-shot image, because the scene of the long-shot image generally does not suddenly change to a great extent, correspondingly, the sampling period may be set to long; however, the scene of a close-shot image generally changes much, and therefore, the sampling period may be set to short.

In an example embodiment of this embodiment of this application, the background attribute comprises:

a background change attribute.

In this example embodiment, the background change attribute comprises a change frequency of the background and a change amount of the background.

In this example embodiment, the background change attribute may be determined according to motion posture information of the user.

Generally, when the user moves, the background changes accordingly. Therefore, in an example embodiment, the motion posture information of the user may be acquired by using a motion posture collection component of the user, thereby determining the background change attribute. Herein, the motion posture collection component may be, for example, an acceleration sensor and/or a gyroscope, and the motion posture collection component may be, for example, integrated on a head-mounted device used by the user.

In another example embodiment, the motion of the user may also be determined by using a global position system (GPS) or an indoor positioning module, thereby determining the background change attribute. For example, when the user is taking a bus, motion information of the user is determined according to position information collected by the GPS, thereby determining the sampling period.

In this embodiment of this application, the method further comprises:

determining the background attribute according to at least one background image corresponding to the field of view of the at least one eye.

For example, in this example embodiment, the background change attribute may also be determined by using the change amount of the collected background image.

Because a user operation usually affects content of an image needing to be presented, in a possible embodiment of this application, the sampling period is determined according to an external instruction.

A possible application scenario may be, for example:

A user performs a zooming operation on a piece of content in a first image that has already been presented, and after a zooming instruction corresponding to the zooming operation is acquired, a second image corresponding to the first image and the zooming instruction needs to be presented; in this case, in this method, one acquisition of background information is triggered according to the zooming instruction, and a presentation parameter corresponding to the second image is adjusted according to the background information.

In an example embodiment of this embodiment of this application, the sampling policy may further comprise a sampling region.

In this embodiment of this application, for example, although the background image corresponding to the entire field of view of the user eye may be acquired, it is only required to analyze the part corresponding to the presentation region of the image and acquire the background information, and the other part of the background image does not need to be analyzed.

Therefore, the sampling region may be determined according to a presentation region of the at least one image.

Certainly, a person skilled in the art may know that, in another example embodiment of this embodiment of this application, the sampling region may also be determined according to another policy.

A person skilled in the art may know that, in another example embodiment of this embodiment of this application, the sampling policy may only comprise the sampling region.

S120: Adjust, according to the at least one piece of background information, at least one presentation parameter corresponding to at least one image.

In this embodiment of this application, the at least one presentation parameter may comprise at least one of the following:

color information of the at least one image, a zooming parameter of the at least one image, a presentation region parameter of the at least one image, a luminance parameter of the at least one image, and a content distribution parameter of at least one piece of content in the at least one image.

In this embodiment of this application, when some presentation parameter are adjusted, besides the at least one piece of background information, original states of the presentation parameters also need to be considered, for example, when the color information of the image is adjusted, both the color information of the background information and original color information of the image need to be considered. For adjustment of the presentation parameters of the image, refer to a further description below. Details are not elaborated herein.

The adjusting the color information of the image may be adjusting the color information of the image according to color information of a corresponding background in the background information and current color information of the image. For example, when a sub region in the background image is of a first color, to improve the visual experience of the user, content in the image and corresponding to the sub region may be adjusted to a second color in marked contrast to the first color. For example, when the first color is green, if the content corresponding to the sub region originally is green too, the color corresponding to the content may be adjusted to a color such as black or red in marked contrast to green. Certainly, if there is a certain contrast between the original color of the image and the color of the corresponding part of the background, the color information of the image may be not adjusted.

The zooming parameter of the image comprises: an image zooming parameter for zooming out or in the entire image and a content zooming parameter for zooming out or in a piece of content or a sub region in the image. The former one may be adjusted by processing data corresponding to the image or adjusting a focusing parameter of a presentation device that presents the image, and the latter one may be adjusted by processing data of the corresponding content of the image.

For example, a scenario of adjusting the image zooming parameter may be: There is a highly reflective region at a background corresponding to the edge of the presentation region of the image, and if the presentation parameter of the image is not adjusted, the edge of the image cannot be seen clearly after the image is presented. In this case, in this embodiment of this application, the image zooming parameter of the image may be adjusted according to the luminance information of the background information, and the image is zoomed out, to avoid the highly reflective region for presentation.

The presentation region parameter of the image is a position parameter of the presentation region of the image relative to the field of view of the user. The adjusting the presentation region parameter of the image may be adjusting the presentation region of the image in the field of view from a first position to a second position. For example, the presentation region parameter is adjusted by adjusting a presentation direction (for example, a projection angle) of the presentation device, or the presentation region parameter is adjusted by processing the data of the image. For examples of adjusting the presentation region parameter, reference may be made to records in embodiments shown in FIG. 2b and FIG. 2d below.

The adjusting the luminance parameter of the image may be, for example, adjusting the luminance parameter of the image according to the luminance information in the background information by processing the data of the image or adjusting an output luminance of the presentation device.

The adjusting the content distribution parameter of the content in the image may be, for example: When the at least one piece of background information comprises the texture information of the background, and the texture information indicates that the texture of a sub region is excessively intensive and hinders presentation of the image, a content distribution parameter of content in the image and corresponding to the sub region may be adjusted, to present the content in another region.

Figure 2B:
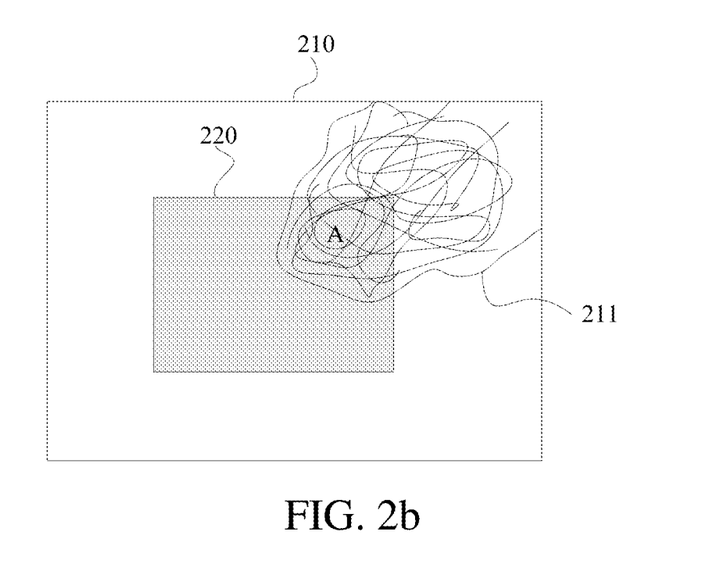
FIG. 2b, FIG. 2c, and FIG. 2d are example schematic diagrams of adjusting a content distribution parameter or presentation region parameter of an image according to background information in an image presentation control method according to an embodiment of this application.

As shown in FIG. 2b, a background 210 corresponding to a field of view of a user comprises a first sub region 211, of which the texture is intensive and complex (in another embodiment, the first sub region may also be inappropriate for image presentation due to an excessively high luminance caused by a color or reflection or the like), and if a presentation parameter of the image is not adjusted, after the image is presented in a corresponding presentation region 220, presented content corresponding to the first sub region 211 is a letter "A", and after the content overlaps the background 210, it is not easy for the user to distinguish the content, as shown in FIG. 2b. After a content distribution parameter of the content corresponding to the letter "A" is adjusted by using the method of this embodiment of this application, the letter "A" is adjusted to be presented in a second sub region that currently does not affect the image presentation, as shown in FIG. 2c, wherein the user experience can be improved.

Figure 2C:
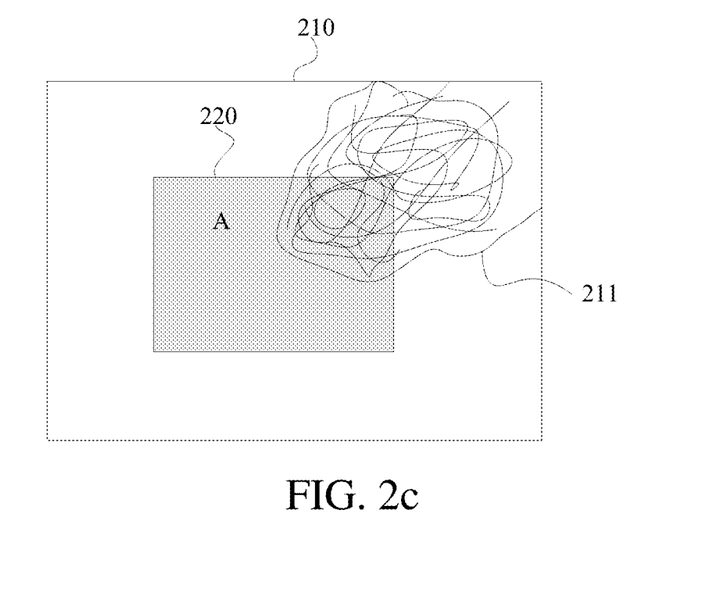
Figure 2D:
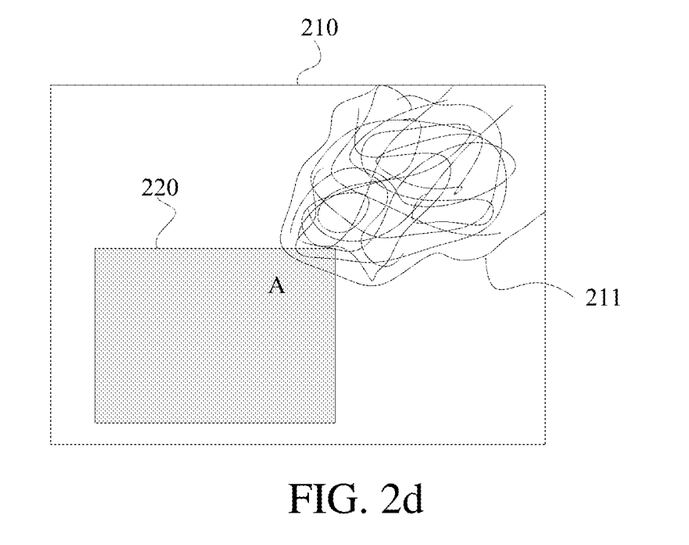

In addition, for the embodiment shown in FIG. 2b, not only the content distribution parameter of the image is adjusted to obtain the image shown in FIG. 2c, but also a presentation region parameter of the image may be adjusted, that is, the entire presentation region 220 of the image is adjusted to a position in the field of view of the user that does not affect image view, as shown in FIG. 2d.

Certainly, besides the presentation parameters corresponding to the image, other data corresponding to the image presentation may also be modified, which is not listed one by one herein.

In this embodiment of this application, the adjustment process may be adjusting one of the presentation parameters according to one or more pieces of background information or adjusting multiple presentation parameters according to one or more pieces of background information.

S130: Present the at least one image to the at least one eye according to the adjusted at least one presentation parameter by means of near-to-eye presentation.

After the at least one presentation parameter is adjusted by performing steps S110 and S120, the at least one image is presented by performing step S130; in this way, the user can see the presented image after the adjustment.

A person skilled in the art may understand that, in the method of the specific example embodiments of this application, sequence numbers of the steps do not mean an execution order, and the execution order of the steps should be determined according to functions and internal logic of the steps, and should not be construed as any limitation on the implementation processes of the example embodiments of this application.

Figure 3:
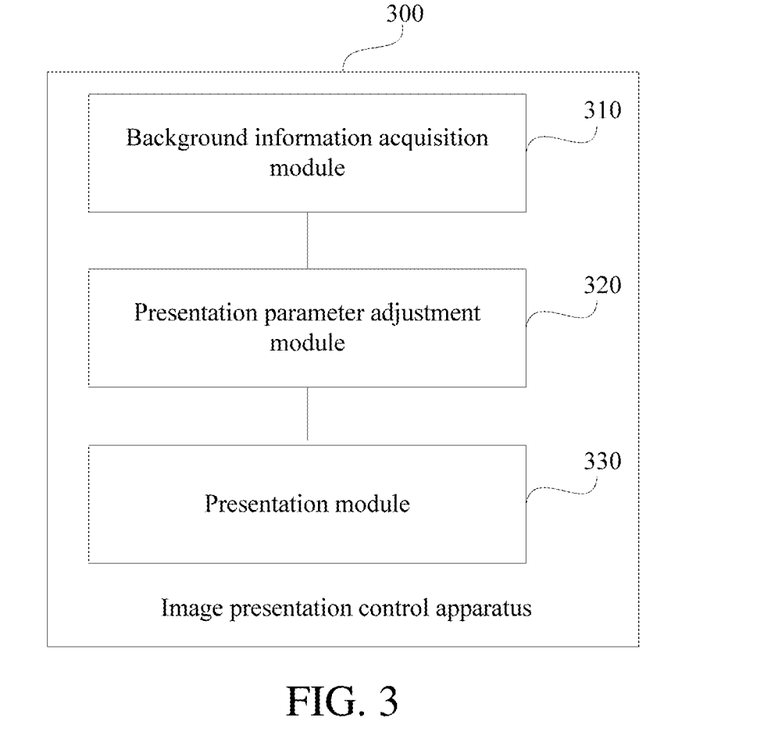
FIG. 3 is an example schematic structural diagram of an image presentation control apparatus according to an embodiment of this application.

As shown in FIG. 3, an embodiment of this application further discloses an image presentation control apparatus 300, comprising:

a background information acquisition module 310, configured to acquire at least one piece of background information corresponding to the field of view of at least one eye of a user;

a presentation parameter adjustment module 320, configured to adjust, according to the at least one piece of background information, at least one presentation parameter corresponding to at least one image; and a presentation module 330, configured to present the at least one image to the at least one eye according to the adjusted at least one presentation parameter by means of near-to-eye presentation.

In this embodiment of this application, the presentation is visual presentation. The image may be a text, pattern, video, or the like for visual presentation.

In this embodiment of this application, a presentation parameter of an image is adjusted according to background information corresponding to a field of view of a user eye, thereby optimizing the image presentation effect.

The modules in this embodiment of this application are further described by using the following example embodiments.

In this embodiment of this application, the at least one piece of background information comprises:

texture information, color information, and luminance information of a background (this application is not limited thereto).

In this embodiment of this application, the texture information of the background comprises: texture distribution information and texture complexity information. The texture complexity information of a region may be measured by using, for example, the number of pixels, the number of colors of pixels, and the like in the region.

In this embodiment of this application, the texture of the background may be generated by the texture of the pattern on the surface of an object, the contour of an object, distribution of multiple objects, and the like in the background.

Figure 4A:
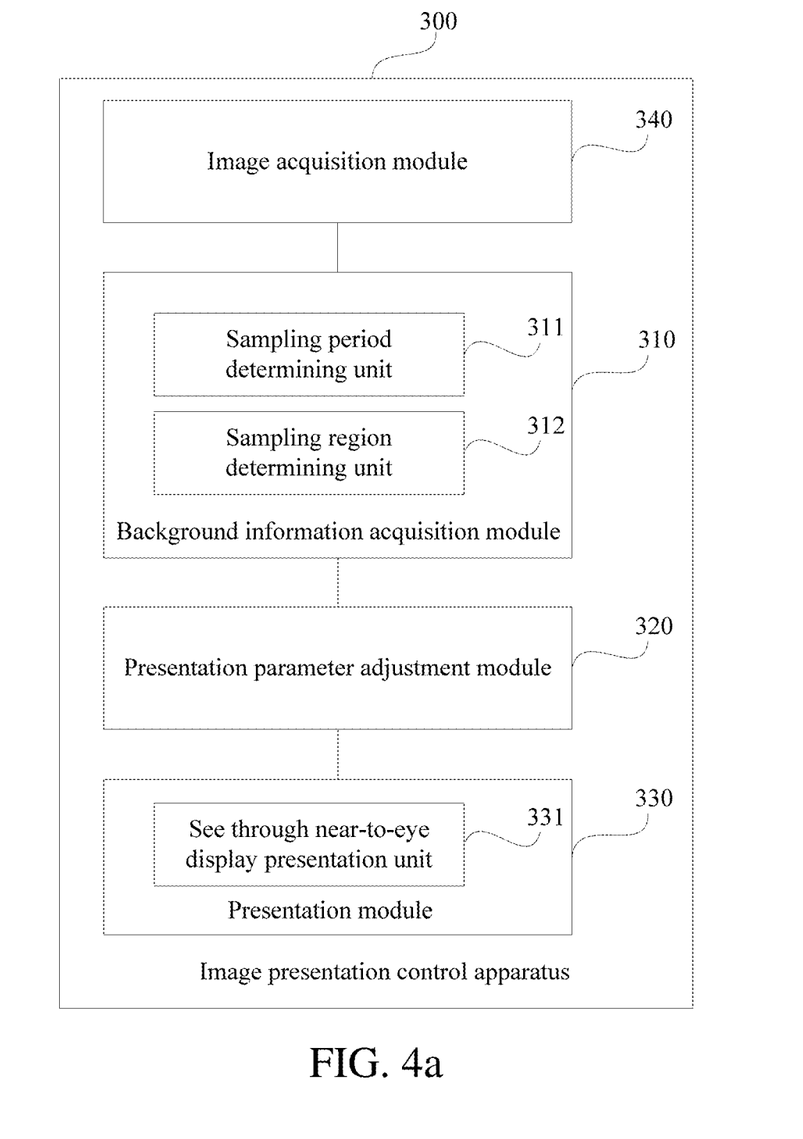
FIG. 4a, FIG. 4b, and FIG. 5 are example schematic structural diagrams of other three image presentation control apparatuses according to embodiments of this application.

As shown in FIG. 4a, in this embodiment of this application, the apparatus 300 further comprises:

an image acquisition module 340, configured to acquire at least one background image corresponding to the field of view of the at least one eye.

In this embodiment of this application, the image acquisition module 340 may be, for example, an image collection component such as a camera, and may be disposed on a near-to-eye device worn by the user, and collect the background image from a near-to-eye position in a direction corresponding to the field of view of the user.

In this embodiment of this application, the background information acquisition module 310 may be further configured to:

acquire the at least one piece of background information according to the at least one background image.

In this embodiment of this application, the background information acquisition module 310 may be an image processing module, configured to process the background image, to obtain texture information, color information, and luminance information corresponding to the background.

In another example embodiment of this embodiment of this application, the background information acquisition module 310 may also be a communications module, configured to send the background image to an external component, and acquire, from the external component, background information corresponding to the background image.

In another example embodiment of this embodiment of this application, the background information acquisition module 310 may further comprise a photosensitive component, configured to collect the luminance information in the background information.

For a wearable device, when using the device, the user may move or the user may be on a moving carrier (for example, on a bus), and therefore, the background corresponding to the field of view of the user eye may continuously change; in addition, the presented image also continuously changes, for example, the at least one image may be an image of one more frames in a video. Therefore, a presentation parameter of the at least one image needs to be dynamically adjusted at a frequency. In this embodiment of this application, the background information acquisition module 310 is further configured to:

acquire the at least one piece of background information according to a sampling policy.

In this embodiment of this application, the sampling policy comprises a sampling period.

In an example embodiment of this embodiment of this application, the sampling period may be set to a fixed value, for example, a fixed value set by default, or a value manually set by the user, or may be set to correspond to a presentation frequency of the at least one image.

In another example embodiment of this embodiment of this application, the sampling period is automatically adjusted according to an environment change, a motion state of the user, or the like. In this example embodiment, the background information acquisition module 310 comprises:

a sampling period determining unit 311, configured to determine the sampling period.

In this example embodiment of this embodiment of this application, the sampling period determining unit 311 may:

determine the sampling period according to an image attribute of the at least one image, or determine the sampling period according to a background attribute of a background corresponding to the field of view.

In an example embodiment, the image attribute of the at least one image comprises:

an image change frequency of the at least one image.

For example, when the at least one image is a group of photos that are automatically played according to a set time in a slide manner, the sampling period may correspond to the set time, for example, be the same as the set time, and the background information is acquired before each next photo is played (for example, within 0.1 second before the playback).

In an example embodiment, the image attribute of the at least one image comprises:

a dynamic/static attribute of the at least one image.

Herein, the dynamic/static attribute of the image comprises that: the image is a static picture, for example, a photo, or a picture inserted in a webpage; or is an image in a dynamic video, for example, an image of each frame in a movie.

When the image is a static picture, the sampling period may be, for example, set to a long time; when the image is an image in a dynamic video, the sampling period may be, for example, set to a short time.

In this example embodiment, when the at least one image corresponds to a dynamic video, the image attribute further comprises:

an image scenario attribute of the at least one image.

In this example embodiment, the image scenario attribute of the image comprises:

whether the image is a close-short image or a long-shot image.

Generally, when the image is a long-shot image, because the scene of the long-shot image generally does not suddenly change to a great extent, correspondingly, the sampling period may be set to long; however, the scene of a close-shot image generally changes much, and therefore, the sampling period may be set to short.

In an example embodiment of this embodiment of this application, the background attribute comprises:

a background change attribute.

In this example embodiment, the background change attribute comprises a change frequency of the background and a change amount of the background.

In this example embodiment, the background change attribute may be determined according to motion posture information of the user.

Generally, when the user moves, the background changes accordingly. Therefore, the motion posture information of the user may be acquired by using a motion posture collection component of the user, thereby determining the background change attribute. Herein, the motion posture collection component may be, for example, an acceleration sensor and/or a gyroscope, and the motion posture collection component may be, for example, integrated on a head-mounted device used by the user.

In this embodiment of this application, the method further comprises:

determining the background attribute according to at least one background image corresponding to the field of view of the at least one eye.

For example, in this example embodiment, the background change attribute may also be determined by using the change amount of the collected background image.

In an example embodiment of this embodiment of this application, the sampling policy may further comprise a sampling region.

In this example embodiment, the background information acquisition module 310 comprises:

a sampling region determining unit 312, configured to determine the sampling region according to a presentation region of the at least one image.

In this embodiment of this application, for example, although the background image corresponding to the entire field of view of the user eye is acquired, it is only required to analyze a sampling region corresponding to the presentation region of the image and acquire the background information, and the other part of the background image does not need to be analyzed.

Certainly, a person skilled in the art may know that, in another example embodiment of this embodiment of this application, the sampling region may also be determined according to another policy.

In this embodiment of this application, the at least one presentation parameter comprises:

color information of the at least one image, a zooming parameter of the at least one image, a presentation region parameter of the at least one image, a luminance parameter of the at least one image, and a content distribution parameter of at least one piece of content in the at least one image.

Certainly, besides the presentation parameters corresponding to the image, other data corresponding to the image presentation may also be modified, which is not listed one by one herein.

In this embodiment of this application, the presentation parameter adjustment module 320 may adjust one of the presentation parameters according to one or more pieces of background information or adjust multiple presentation parameters according to one or more pieces of background information.

For the manner of adjusting the presentation parameters according to the background information, refer to the corresponding description in the embodiments shown in FIG. 1, FIG. 2b, and FIG. 2c. Details are not described herein again.

As shown in FIG. 4a, in an example embodiment of this embodiment of this application, the presentation module 330 comprises:

a see through near-to-eye display presentation unit 331, configured to present the at least one image to the at least one eye according to the adjusted at least one presentation parameter by means of see through near-to-eye display presentation.

The see through near-to-eye display presentation is displaying the image at a position near to the eye of the user in a see through manner, wherein while seeing the displayed image, the user can also see a background image in the field of view through the displayed image. In this example embodiment, the see through near-to-eye display presentation unit may comprise, for example, a display component of a pair of smart glasses, to display the image on a lens of the glasses in a see through manner, wherein while seeing the displayed image, the user can also see the background image in the field of view as the line of sight passes through the lens.

Figure 4B:
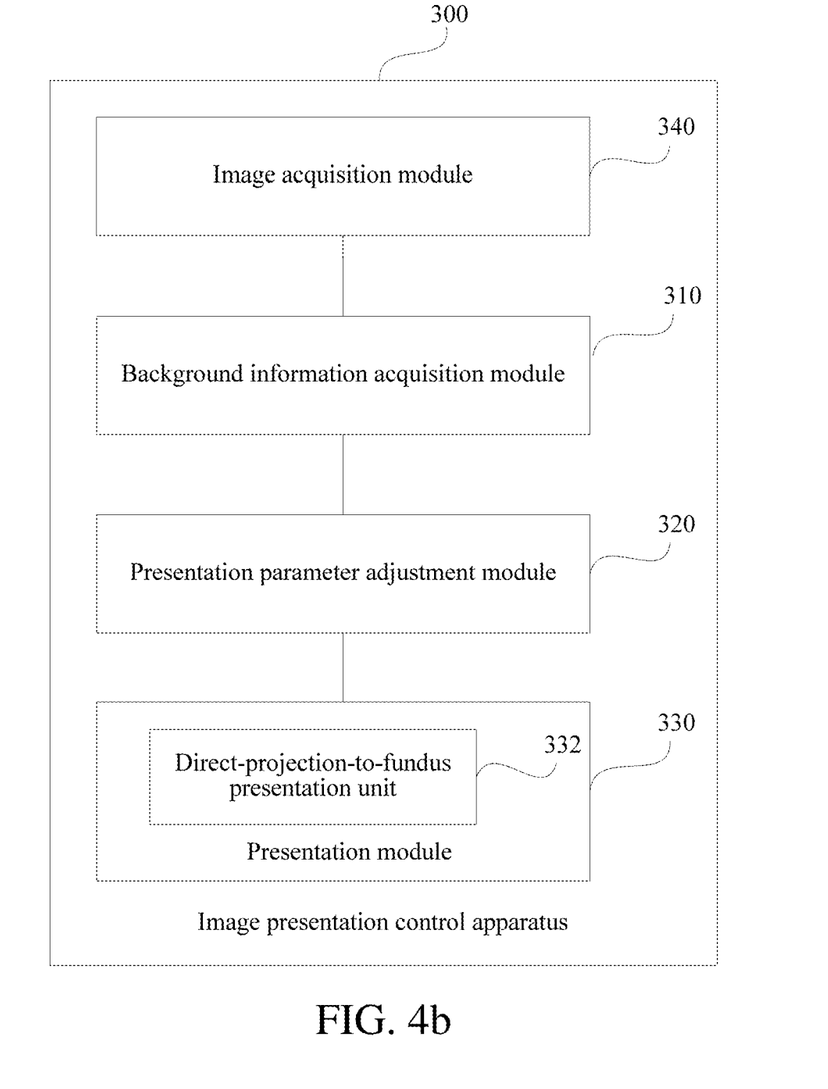

As shown in FIG. 4b, in another example embodiment of this embodiment of this application, the presentation module 330 comprises:

a direct-projection-to-fundus presentation unit 332, configured to present the at least one image to the at least one eye according to the adjusted at least one presentation parameter by means of direct-projection-to-fundus presentation.

The direct-projection-to-fundus presentation unit 332 is disposed at a position near to the user eye, and directly projects an image, to be presented to the user, to a fundus of the user by using a micro projection component and an optical component forming the optical path between the micro projection component and the user eye, wherein likewise, while seeing the projected image, the user can also see a background image in the field of view through the projected image.

Figure 5:
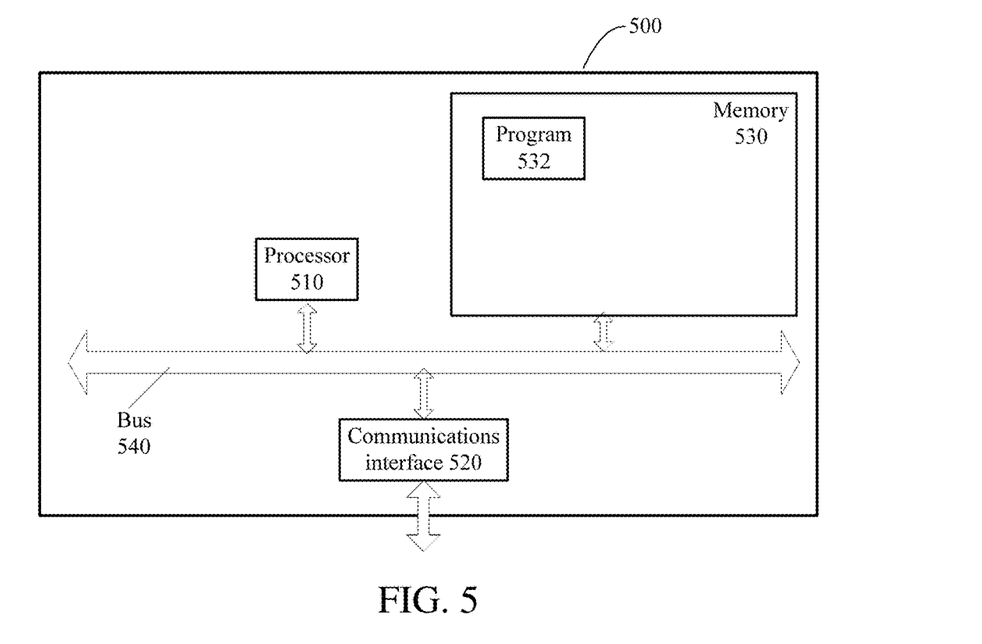

FIG. 5 is a schematic structural diagram of another image presentation control apparatus 500 according to an embodiment of this application. The specific embodiment of this application does not impose any limitation on specific implementation of the image presentation control apparatus 500. As shown in FIG. 5, the image presentation control apparatus 500 may comprise:

a processor 510, a communications interface 520, a memory 530, and a communications bus 540, wherein the processor 510, the communications interface 520, and the memory 530 communicate with each other by using the communications bus 540;

the communications interface 520 is configured to communicate with a network element such as a client; and the processor 510 is configured to execute a program 532, and specifically may execute relevant steps in the foregoing method embodiments.

Specifically, the program 532 may comprise program code, wherein the program code comprises a computer operation instruction.

The processor 510 may be a central processing unit (CPU), or an application specific integrated circuit (ASIC), or be configured or implemented as one or more integrated circuits in this embodiment of this application.

The memory 530 is configured to store the program 532. The memory 530 may comprise a high speed random access memory (RAM), and may further comprise a non-volatile memory, for example, at least one disk memory. The program 532 specifically may be used to instruct the image presentation control apparatus 500 to perform the following steps:

acquiring at least one piece of background information corresponding to a field of view of at least one eye of a user;

adjusting, according to the at least one piece of background information, at least one presentation parameter corresponding to at least one image; and presenting the at least one image to the at least one eye according to the adjusted at least one presentation parameter by means of near-to-eye presentation.

For the specific implementation of the steps in the program 532, reference may be made to the corresponding description of the corresponding steps and units in the foregoing embodiments. Details are not described herein again. It may be clearly understood by a person skilled in the art that, for the purpose of convenient and brief description, for a detailed working process of the foregoing devices and modules, reference may be made to the corresponding process description in the foregoing method embodiments, and details are not described herein again.

Figure 6:
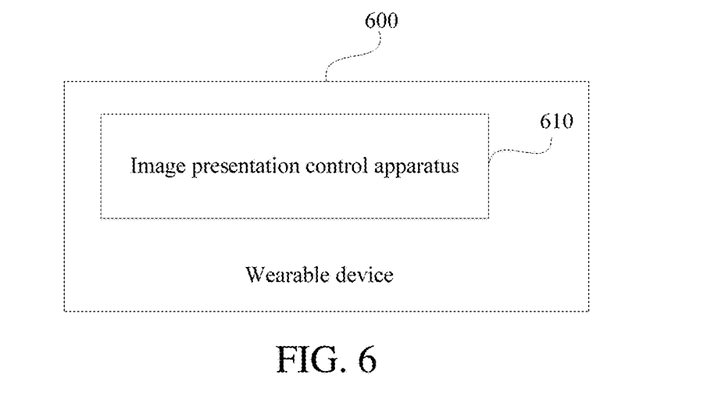
FIG. 6 is an example schematic structural diagram of a wearable device according to an embodiment of this application.

As shown in FIG. 6, an embodiment of this application further provides a wearable device 600, comprising the image presentation control apparatus 610 in the embodiment shown in FIG. 3, FIG. 4a, FIG. 4b, or FIG. 5.

In this embodiment of this application, the wearable device is a near-to-eye wearable device, for example, smart glasses or a helmet-mounted eyepiece.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the methods described in the embodiments of this application. The foregoing storage medium comprises: any medium that can store program code, such as a USB flash drive, a removable hard disk, a read-only memory (ROM), a RAM, a magnetic disk, or an optical disc.

The foregoing descriptions are merely intended to describe this application, but are not intended to limit the protection scope of this application. A person skilled in the art may make various alternations and variations without departing from the spirit and scope of this application. Therefore, all equivalent technical solutions shall also fall within the scope of this application, and the patent protection scope of this application shall be subject to the appended claims.

What is claimed is:

1. A method, comprising:
   acquiring, by a system comprising a processor, at least one piece of background information corresponding to a field of view of at least one eye of a user according to a sampling policy, wherein the at least one piece of background information comprises texture information, wherein the sampling policy comprises a sampling period, and wherein the sampling period is based on a background attribute of a background corresponding to the field of view;
   adjusting, according to the at least one piece of background information, at least one presentation parameter corresponding to at least one image, wherein the at least one presentation parameter comprises at least one of the following: a zooming parameter, a presentation region parameter of the at least one image, or a content distribution parameter of at least one piece of content in the at least one image; and
   presenting, via a display device of the system, the at least one image to the at least one eye according to the at least one presentation parameter that is adjusted by near-to-eye presentation.

2. The method of claim 1, wherein the at least one presentation parameter comprises at least one of the following:
   color information or a luminance parameter of the at least one image.

3. The method of claim 1, wherein the at least one piece of background information comprises at least one type of:
   color information or luminance information of a background in the field of view.

4. The method of claim 1, further comprising:
   acquiring, by a system, at least one background image corresponding to the field of view of the at least one eye.

5. The method of claim 4, wherein the acquiring the at least one piece of background information corresponding to the field of view of the at least one eye of the user comprises:
   acquiring the at least one piece of background information according to the at least one background image.

6. The method of claim 1, wherein the field of view is the field of view for both eyes of the user.

7. The method of claim 6, wherein the sampling policy further comprises a sampling region.

8. The method of claim 7, further comprising:
   determining, by the system, the sampling region according to a presentation region of the at least one image.

9. The method of claim 1, further comprising:
   determining, by the system, the sampling period.

10. The method of claim 9, wherein the determining the sampling period comprises determining, by the system, the sampling period according to the background attribute of a background corresponding to the field of view.

11. The method of claim 10, wherein the determining the sampling period comprises:
    determining a background attribute according to the background corresponding to the field of view, wherein the field of view is based on both eyes of the user.

12. The method of claim 10, wherein the background attribute comprises:
    a background change attribute.

13. The method of claim 12, further comprising:
    determining, by the system, the background change attribute according to motion posture information of the user.

14. The method of claim 10, further comprising:
    determining, by the system, the background attribute according to the background corresponding to the field of view of the at least one eye.

15. The method of claim 9, wherein the determining the sampling period comprises:
    determining the sampling period according to an external instruction.

16. The method of claim 1, wherein the near-to-eye presentation comprises:
    see through near-to-eye display presentation.

17. The method of claim 1, wherein the near-to-eye presentation comprises:
direct-projection-to-fundus presentation.

18. An apparatus, comprising:
a processor, coupled to a memory, that executes or facilitates execution of executable modules, comprising:
a background information acquisition module configured to acquire at least one piece of background information corresponding to a field of view of at least one eye of a user in accord with a sampling policy and based on a sampling period received by the background information acquisition module, wherein the at least one piece of background information comprises texture information, and wherein the sampling period is based on a background attribute corresponding to the field of view;
a presentation parameter adjustment module configured to adjust, according to the at least one piece of background information, at least one presentation parameter corresponding to at least one image, wherein the at least one presentation parameter comprises at least one of the following: a zooming parameter, a presentation region parameter of the at least one image, or a content distribution parameter of at least one piece of content in the at least one image; and
a presentation module configured to present, via a display device, the at least one image to the at least one eye according to the at least one presentation parameter that is adjustable using near-to-eye presentation.

19. The apparatus of claim 18, wherein the at least one presentation parameter comprises at least one of:
color information or a luminance parameter of the at least one image.

20. The apparatus of claim 18, wherein the at least one piece of background information comprises at least one type of:
color information or luminance information of a background in the field of view.

21. The apparatus of claim 18, wherein the executable modules further comprise:
an image acquisition module configured to acquire at least one background image corresponding to the field of view of the at least one eye.

22. The apparatus of claim 21, wherein the background information acquisition module is further configured to:
acquire the at least one piece of background information according to the at least one background image.

23. The apparatus of claim 18, wherein the field of view corresponds to both eyes of the user.

24. The apparatus of claim 18, wherein the sampling policy further comprises a sampling region.

25. The apparatus of claim 24, wherein the background information acquisition module comprises:
a sampling region determining unit configured to determine the sampling region according to a presentation region of the at least one image.

26. The apparatus of claim 18, wherein the background information acquisition module comprises:
a sampling period determining unit configured to determine the sampling period based on the background attribute corresponding to the field of view.

27. The apparatus of claim 26, wherein the sampling period is further based on an image attribute of the at least one image.

28. The apparatus of claim 27, wherein the image attribute of the at least one image is a background change attribute.

29. The apparatus of claim 26, wherein the sampling period determining unit is further configured to:
determine the background attribute.

30. The apparatus of claim 26, wherein the sampling period determining unit is further configured to:
determine the sampling period according to an external instruction.

31. The apparatus of claim 18, wherein the background attribute comprises a background change attribute corresponding to motion posture information of the user, and wherein the sampling period is further based on the background change attribute.

32. The apparatus of claim 18, wherein the presentation module comprises:
a see through near-to-eye display presentation unit configured to present the at least one image to the at least one eye according to the at least one presentation parameter as adjusted using see through near-to-eye display presentation.

33. The apparatus of claim 18, wherein the presentation module comprises:
a direct-projection-to-fundus presentation unit configured to present the at least one image to the at least one eye according to the at least one presentation parameter as adjusted using direct-projection-to-fundus presentation.

34. A wearable device, comprising:
a processor, coupled to a memory, that facilitates performance of operations comprising:
acquiring background information corresponding to a field of view in accord with a sampling policy, wherein the background information comprises texture information, and wherein the sampling policy comprises a sampling period based on a background attribute of a background corresponding to the field of view;
adjusting a presentation parameter for the image based on the background information, wherein the presentation parameter comprises a zooming parameter, a presentation region parameter, or a content distribution parameter; and
displaying, on a display device located proximate to an eye, the image according to the presentation parameter.

35. A non-transitory computer readable storage device comprising executable instructions that, in response to execution, cause a device comprising a processor to perform operations, comprising:
determining a sampling period according to a background attribute of a background corresponding to a field of view of an eye of a user;
acquiring a piece of background information corresponding to the field of view based on a sampling policy and the sampling period, wherein the piece of background information comprises texture information;
adjusting, according to the piece of background information, a presentation parameter corresponding to an image resulting in an adjusted presentation parameter, wherein the presentation parameter comprises at least one of the following: a zooming parameter, a presentation region parameter of the at least one image, or a content distribution parameter of at least one piece of content in the at least one image; and
presenting, via a display device, the image to the eye according to the adjusted presentation parameter by near-to-eye presentation.

* * * * *